| United States Patent [19] | [11] | 4,278,544 |
|---|---|---|
| Takashima | [45] | Jul. 14, 1981 |

[54] FILTER MEDIUM FOR FLUID

[75] Inventor: Masaru Takashima, Komae, Japan

[73] Assignee: Aikoh, Co., Ltd., Tokyo, Japan

[21] Appl. No.: 134,263

[22] Filed: Mar. 26, 1980

[51] Int. Cl.³ .............................................. B01D 39/20
[52] U.S. Cl. ...................................... 210/503; 55/523; 210/510
[58] Field of Search .................... 55/523; 210/503, 510

[56] References Cited

U.S. PATENT DOCUMENTS

| 3,235,089 | 2/1966 | Burroughs | 210/510 |
| 3,939,079 | 2/1976 | Uchiyama et al. | 210/510 |

*Primary Examiner*—Ivars C. Cintins
*Attorney, Agent, or Firm*—Fay & Sharpe

[57] ABSTRACT

A filter medium for fluid, which is a sintered body in which alumina refractory is 100 parts by weight, more than 95% by weight of said refractory being pelletized spheroids of less than 1.0 mm in particle size, while inorganic binder having particle size less than 40 microns is in the range 15–30 parts by weight and fluoride and/or oxide of lithium is in the range 0.1–1 part by weight, and in which filter medium the mean pore diameter is in the range 500–1 microns and the porosity is in the range from 15 to 40%.

1 Claim, No Drawings

FILTER MEDIUM FOR FLUID

This invention relates to a filter medium for fluid intended to filter a fluid of liquid or gas.

Ceramic filter medium among filter media for fluid has superior performance for heat and chemical resistance compared with organic and metallic filter media so that the ceramic filter medium is used in a wide range such as filtration, diffusion, recovery, transfer, mixing and foaming of fluid. However, generally used known ceramic filter medium is one whose aggregate is crushed particle in the form of needle or mass, said aggregate being obtained by crushing and classifying a mass made after melting or sintering natural or artificial ores, or one whose aggregate is molten glass beads, and therefore such filter medium has the following demerits:

(1) Aggregate of crushed particle made of large molten or sintered mass is internally provided with fine cracks produced by crushing impact, and the acute angular pointed heads being exposed at the surface of filter medium are easily released due to impact or scratch stress thereby to be mixed into the filtering fluid. This demerit may be critical for filter parts accompanied by vibration or impact or filter medium which filters a fluid of high pressure and high viscosity.

(2) Aggregate of crushed particle has low bulk specific gravity and bad filling property. Accordingly, if moulding pressure is raised to increase the density of the filter medium the structure of the medium may be unevenly distributed or the aggregate may be destroyed.

(3) Being in the form of needle or mass the aggregates of crushed particle have greater contact angle at their mutual contact points, less contact area are less number of contact points. In such structure binder may not be effectively concentrated to the contact points by the softening fluidization of the binder so that it is difficult to improve the mechanical strength of the filter medium.

(4) The pores formed between the aggregates by the aggregates of crushed particle are in the bent, worm or loop form thereby to present a great filtering resistance of fluid.

(5) Filter medium which takes glass beads as aggregate has not said demerits, but since glass beads are amorphous they have both low impact strength and heat resistance.

The inventor of this invention has noticed that said demerits of ceramic filter medium are caused by the shape and matter properties peculiar to the crushed particle of the aggregate as well as by the binding mechanism of the aggregate with regard to crushed particle, and by the aggregate strength with regard to glass beads whereby he has suceeded in an improvement of filter medium.

The present invention is concerned with a filter medium, for fluid, which is a sintered body in which alumina refractory is 100 parts by weight, more than 95% by weight of said refractory being pelletized spheroids of less than 1.0 mm in particle size, while inorganic binder having particle size less than 40 microns is in the range 15-30 parts by weight and fluoride and/or oxide of lithium is in the range 0.1-1 part by weight, and in which filter medium the mean pore diameter is in the range 500-1 microns and the porosity is in the range from 15% to 40%. The fitler medium thus prepared has performance endurable for use under high temperature.

Spherical alumina refractory can be obtained, for example, by an injection method of molten substance in which high purity mulite is molten, its melt is injected from nozzle into a reducing atmosphere of a fixed temperature, and compressed gases such as air and argon are blown to said melt flow thereby to scatter and pelletize the melt. Further, it is possible to obtain the spherical alumina refractory by a pelletizing and sintering method in which a slurry mixture is extruded under pressure from a nozzle, said mixture being made by adding a binding agent to the fine mullite powder of high purity and kneading them, while cutting said injected mixture at predetermined length, said cut pieces are rolled by a pelletizing machine to be pelletized to spheroids of desired particle size, and thereafter the pellets are sintered. The mullite spheroids thus obtained have tough crystal structure where fine crystals of the mullite are intricately blended and their sphericalness is excellent so that they are ideal as aggregate. In case a filter medium is manufactured with spherical alumina refractory as aggregate, the mean pore diameter of the spheroids may be determined of the aggregate. Generally, a filter medium is produced in such a manner that aggregates are mixed with an inorganic binder added with water to be wet, the mixture is charged into mold, and after releasing from the mold the filter medium is dried and burned. In the case of particularly requiring a uniform mixing, however, addition of an organic binder will produce a more tight filter medium.

This is, in order that the excellent tight filling performance of the spherical alumina refractory is utilized whereby the filling ratio is brought near theoretical value and the binder is highly concentrated to the contact points of the aggregates, paraffin may be used for example as an organic additive material and the hot kneading method and the hot pressing method are employed in combination to effectively carry out said operations.

Mullite spheroids are charged into a hot keading machine to be heated at a temperature in the range 100-150° C. and then solid paraffin is charged by 5-7% by weight ratio to the aggregates and stirred when the surface of the spheroids is melt coated with the paraffin at uniform thickness. Secondly, an inorganic binder (such as fine glass powder) previously heated at same temperature is gradually added and agitated, and in 10 to 15 minutes a uniform coating layer of the binder may be formed. Thirdly, the kneaded material is cooled while being passed through a sieve and gradually dispersed by air stream, when the kneaded material will be prevented from coagulating to mass thanks to viscosity of paraffin and it is possible to obtain a mixture of good fluidity. In the mixture thus obtained the binder is hot adhered firmly to the spherical alumina refractory aggregates by paraffin, but at the room temperature after cooling the viscosity of paraffin is so high as to be near solid, so that the mixture does not mutually adhere but is in good fluidity, and therefor the mixture can be uniformly dispersed to each portion of the metallic mold. This condition is necessary to obtain a filter medium having a uniform pore distribution. Then if the mixture charged into the metallic mold is pressurized while being heated at a temperature in the range 100°-150° C. the paraffin which has been lowered in viscosity is soft fluidized at the surface of the spheroids in a state being accompanied by the binder, thereby concentrating to the contact points of the aggregates. Now that the binder could be concentrated to the contact points of the aggregates in a moulding process it is capable of using inorganic binders in a wider range than the conventional case when it depended only upon a fluidity caused by viscosity at high temperature. Furthermore, the paraffin which has been lowered in viscosity by heating is active as lubricant between aggregates so that the filling ratio can be brought close to theoretical value and the moulding pressure is lowered whereby it is possible to mould a filter medium of a uniform density distribution. Such actions during heating and pressurizing may be effectively carried out if the aggregate is spherical but not in the case of the aggregate of crushed particle because of the bent surface of the aggregate. In the case of ceramic filter medium the binder must be concentrated to the contact points between aggregates, and the binder being adhered to other portions than the contact points not only does not contributes for the binding of aggregates but also is released to be mixed into the filter fluid.

If these mouldings are burned, after cooling, at a sintering temperature (1320° C. in the case of fine glass powder) of binder through known burning furnace it is capable of firmly binding the aggregates.

The filter medium for fluid thus obtained has a high filling ratio of aggregates. Accordingly said filter medium has a great mechanic strength, is obtainable a pressure resistant strength higher than 500 Kg/cm$^2$ at room temperature, uniform in pore distribution and excellent in chemical resistance.

The spherical alumina refractory to be material constituting the filter medium for fluid of the invention, is selected from the group of industrial alumina containing more than 50% by weight of $Al_2O_3$, corundum, mullite, bauxit diaspore and sillimanite, said refractory is made spherical by said steps and used as aggregate. Referring to particle size, the alumina refractory of less than 1.0 mm must be contained by more than 95% by weight in such a good way that the pore diameter of filter medium is in the range 550-1 microns and the porosity is from 15 to 40% when said filter medium is produced. If coarse particles greater than 1 mm exceed 5% the pores of the filter medium will not be evenly distributed.

As the inorganic binder there is used fine powder of kaolinite, bentonite, agalmatolite, burned and sintered alumina, siliceous stone, feldspar, porcelain stone and glass which have sintering properties such as not lowering heat resistancy of the aggregates as much as possible, and fine powder of ores specifically having sintering properties among ores, such as chromite, apatite and colemanite. The more fine in the particle size the better. If the particle size is less than 40 microns, however, said ores can be practically used. In the use proportion of the binder it may be less used for coarse aggregates and it is likely to increase the binder because the surface area becomes larger as the aggregates become more fine. However, even if the binder exceeds 30 parts by weight against 100 parts by weight of the aggregates, the binding effect will not change. Moreover, in such a case there will be caused a reverse effect of embedding the pores of the filter medium. On the other hand, with less than 15 parts by weight of the binder the pressure resistant strength of said filter medium becomes low even with aggregates whose particle size is about 1 mm, there is sometimes not obtainable a pressure resistant strength 500 Kg/cm$^2$ which is regarded as a practically usable range. Further, as a sintering assistant of the binder there can be used, mixed with the binder, lithium fluoride and/or lithium oxide of the same particle size as the binder. If exceeds 1 part by weight against 100 parts of the aggregates, however, the sintering assistant may lower the melting point of the binder when the hot strength of said filter medium is lowered whereby the filter medium is not suitable for use under high temperature atmosphere such as in gas blowing nozzle. On the other hand, with less than 0.1 part by weight of the sintering assistant against 100 parts by weight of the aggregates the effect of regulating the melting point of the binder is weakenedd so that such a less amount of sintering assistant will not be practically useful.

The filter medium for fluid according to the invention, which is produced by mixing, moulding and burning each of said component materials in accordance with the above methods, is most suitable as inert gas blowing nozzle or plug for molten metal thanks to its heat resistant characteristics. Needless to state, however, it is also useful for filtering, diffusing, recovering, transferring, mixing and foaming fluids which are used for ceramic filter medium.

The invention will now be described, by way of example, with reference to a porous plug for blowing molten steel.

| Particle size distribution of mullite spherical aggregate: | | |
|---|---|---|
| Above 1 mm | 0% | by weight |
| 1 mm - 500 microns | 43% | by weight |
| 500 - 350 microns | 37% | by weight |
| 350 - 177 microns | 17% | by weight |
| 177 - 74 microns | 3% | by weight |
| Compounding of mixtures: | | |
| Mullite spherical aggregate | 100.0% | by weight |
| Sintered alumina | 5.0% | " |
| Burned alumina | 7.5% | " |
| Agalmatolite | 2.0% | " |
| Porcelain stone | 2.0% | " |
| Bentonite | 1.0% | " |
| Chromium oxide | 2.0% | " |
| Lithium fluoride | 0.5% | " |
| Bulk specific gravity of moulded article: | 2.10 g/cm$^3$ | |
| Burning temperature: | 1550° C. | |
| (1) Property of matter of product: | | |
| Bulk specific gravity | 2.47 g/cm$^3$ | |
| Compressive strength | 550 Kg/cm$^2$ | |
| Porosity | 26.7% | |
| Gas permeating ratio | 2.5 cm$^3$/cm$^2$ . cm . sec. . water column cm | |
| Mean pore diameter | 80 microns | |
| (2) Comparative article: Destroyed particles of mullite in the same standard particle size as in the invention were mixed with the binder of same components and at same ratio, and the mixture was burned at same temperature. The article thus prepared has the following property of matter: | | |
| Bulk specific gravity | 2.35 g/cm$^3$ | |
| Compressive strength | 510 Kg/cm$^2$ | |
| Porosity | 25.5% | |
| Gas permeating ratio | 1.5 cm$^3$/cm$^2$ . cm . sec. . water column cm | |

Each of the product of this invention and the comparative article was mounted to the bottom of a 20 ton ladle, as a gas blowing plug having a 100 mm upper diameter, a 150 mm bottom diameter and a 200 mm height. A molten steel at a temperature in the range 1600°-1700° C. was poured into the ladle and an argon gas of 0.5-2.0 Kg/cm$^2$ was introduced through the plug thereby to carry out a degasifying treatment for 50 and 90 minutes. At that time, said product and said article could be compared in their endurable frequency as follows:

| Product of this invention: | 3-5 times |
|---|---|
| Comparative article: | 1-2 times |

Thus there was noticed a great difference between said product and said article and that the former could have a prolonged life by 1.5-5 times compared with the latter.

What is claimed is:

1. A filter medium for the filtration of a fluid at high temperatures which is a sintered body and has a mean pore diameter in the range of 500 microns to 1 mm and a porosity in the range of 15-40% which comprises:
   (a) 100 parts by weight of an alumina refractory, with more than 95% by weight of said refractory being pelletized spheroids having a particle size of less than 1.0 mm, said refractory being at least one material selected from the group consisting of alumina, corundum, mullite, bauxite, diaspore and sillimanite;
   (b) 15-30 parts by weight of an organic binder having a particle size less than 40 microns, with said binder being at least one material selected from the group consisting of kaolinite, bentonite, agalmatolite, burned alumina, sintered alumina, siliceous stone, feldspar, porcelian stone and glass; and (c) 0.1-1.0 parts by weight of a sintering aid wherein said sintering aid is at least one material selected from the group consisting of lithium fluoride and lithium oxide.

* * * * *